US007446788B2

(12) United States Patent
Hart

(10) Patent No.: US 7,446,788 B2
(45) Date of Patent: Nov. 4, 2008

(54) PRINTING

(75) Inventor: Philip Hart, Nottingham (GB)

(73) Assignee: Zipher Limited, Nottingham (GB)

( * ) Notice: Subject to any disclaimer, the term of this patent is extended or adjusted under 35 U.S.C. 154(b) by 102 days.

(21) Appl. No.: 10/469,315

(22) PCT Filed: Mar. 1, 2002

(86) PCT No.: PCT/GB02/00849

§ 371 (c)(1),
(2), (4) Date: Jan. 6, 2004

(87) PCT Pub. No.: WO02/070267

PCT Pub. Date: Sep. 12, 2002

(65) Prior Publication Data

US 2004/0104991 A1 Jun. 3, 2004

(30) Foreign Application Priority Data

Mar. 1, 2001 (GB) ................................ 0105067.3

(51) Int. Cl.

*B41J 2/355* (2006.01)
*B41J 2/36* (2006.01)
*B41J 2/365* (2006.01)
*B41J 2/37* (2006.01)
*B41J 2/01* (2006.01)
*G01D 15/10* (2006.01)
*H04N 1/024* (2006.01)
*H05B 1/00* (2006.01)

(52) U.S. Cl. ....................... 347/180; 347/188; 347/190; 347/193; 347/195; 347/103

(58) Field of Classification Search ................. 347/103, 347/8, 23, 74, 15, 171, 180, 188, 189, 190, 347/191, 192, 193, 194, 195, 196, 211; 358/1.2, 358/303

See application file for complete search history.

(56) References Cited

U.S. PATENT DOCUMENTS 4,394,092 A * 7/1983 Osmera et al. ......... 400/120.01

(Continued)

FOREIGN PATENT DOCUMENTS

| | | | |
|---|---|---|---|
| EP | 0 329 478 | | 8/1989 |
| EP | 501487 | A2 * | 9/1992 |
| EP | 0 945 273 | | 9/1999 |
| JP | 61 022960 | | 1/1986 |

*Primary Examiner*—Stephen D Meier
*Assistant Examiner*—Leonard S. Laing
(74) *Attorney, Agent, or Firm*—Beusse Wolter Sanks Mora & Maire, P.A.

(57) ABSTRACT

A method and apparatus for transferring an image of predetermined length onto a substrate by selective energisation of a row of printing elements in a printhead of a printing apparatus. The printing apparatus may be arranged with a print ribbon located between the printhead and the substrate such that ink is selectively transferred from the ribbon to the substrate as a result of energisations of the printing elements. The image to be printed is rendered in memory as a series of rows of pixels and the apparatus is set up to download the rendered rows of pixels to the printhead successively. The relative positioning of successively printed rows of pixels on the substrate is determined by relative displacement between the printhead and the substrate. The apparatus is set up to control the positioning of the rows of pixels by controlling the delay between successive energisations of the printing elements. Operational characteristics of the printing apparatus are determined, and the image is rendered such that the number of rows of the pixels in the rendered image is no greater than the maximum number of rows of pixels which can be printed in the length of the image given the operational characteristics of the printing apparatus. Additional rows of pixels may be printed between pairs of rows of printed which correspond to consecutive rows in the rendered image. The pixel content of each additional row is a function of the pixel content of the adjacent pairs of rows.

11 Claims, 4 Drawing Sheets

U.S. PATENT DOCUMENTS 4,567,488 A 1/1986 Hisatake et al.
4,663,734 A * 5/1987 Berry .................... 400/120.15
5,157,413 A * 10/1992 Nagato et al. ............... 347/199
5,282,057 A * 1/1994 Mailloux et al. ............ 358/445
5,329,614 A * 7/1994 Kidd et al. .................. 345/671
5,357,270 A * 10/1994 Herbert ...................... 347/215
5,394,485 A * 2/1995 Lowe et al. ................. 382/254
5,467,120 A 11/1995 Hisataka et al.
5,499,305 A * 3/1996 Lidke et al. ................. 382/270
5,649,774 A * 7/1997 Harding et al. ............. 400/225
5,816,719 A 10/1998 Palmer
5,897,255 A 4/1999 Sprague
5,971,634 A * 10/1999 Buckby et al. ......... 400/120.01
5,975,672 A * 11/1999 Wen ............................ 347/15
6,025,860 A 2/2000 Pollara
6,042,249 A * 3/2000 Ackley ....................... 400/103
6,078,343 A 6/2000 Jordan
6,188,422 B1 2/2001 Ogura

* cited by examiner

PRINTING

The present invention relates to a method and apparatus for improving the quality of images produced by, and the efficiency of operation of printing equipment.

The invention is concerned with any printing method in which it takes a finite time to convert an electronic control signal demanding printing of a pixel of information into the formation of that pixel. The invention is primarily concerned with thermal transfer printing in which ink carried on a ribbon is selectively melted by contact with a thermal printing head and transferred whilst molten onto a substrate. The invention also has applicability however to other arrangements, for example where a substrate carries a thermally sensitive layer, a printing head selectively heating the thermally sensitive layer so as selectively to convert the layer into pixels of information.

In the case of thermal transfer printing utilising a transfer ink ribbon, a thermal transfer printhead is provided which comprises a single array of printing elements which are generally in the form of a linear array of small resistors bonded to a ceramic support. An energising voltage can be selectively applied to any resistor, causing current to be drawn through any selected resistor such that the resistor is heated. The printhead is brought into contact with a polypropylene ribbon, the side of the ribbon remote from the printhead carrying meltable ink. The inked side of the ribbon is pressed by the printhead against a substrate upon which a pattern of pixels is to be printed. When one of the resistors is energised, ink carried by the adjacent portion of the ribbon is melted and is transferred to the substrate with which it is in contact.

A control system controls the printing of a linear pattern of pixels by selectively energising the resistors. By generating a succession of rows of such patterns in synchronism with relative motion between the printhead, the ribbon and the substrate, pixels are printed at appropriate locations on the substrate to create a 2-dimensional image. The relative movements of the printhead, ribbon and substrate are arranged such that the ribbon is peeled away from the substrate before the transferred ink has had time to solidify, and the ink is then carried away by the substrate and solidifies so as to contribute to the required image on the substrate.

The ribbon must be peeled away from contact with the substrate before the ink has solidified, otherwise the ink may not transfer fully, or other failure modes can occur, for example sticking of the ribbon to the substrate.

Each resistor in the linear array can be individually addressed, that is to say it can be selected to be on (heated up so as to print a pixel of ink) or off (de-energised so as not to melt ink carried by the adjacent ribbon). The electronics controlling the printhead causes rows of pixel data to be printed on the substrate in turn, the rows of pixels contributing to columns of pixels extending in the direction of relative motion between the substrate and the printhead. Generally the relative motion is in a direction perpendicular to the array of resistors and the length of the array is deemed to be in the direction of the X axis whereas the length of the columns of pixels extending from the array is deemed to be in the direction of the Y axis.

A typical thermal transfer coder printhead is 2 inches wide and has a pixel resolution of 300 dots per inch (dpi), that is there are six hundred small resistors bonded to a two inch strip of ceramic support. Thus each row of data comprises six hundred bits of on/off information. Each row of data is transferred to the printhead in synchronism with the relative motion between the printhead and the substrate so that a desired two-dimensional image can be produced. Image data corresponding to the desired final image as it appears on the substrate is stored in an image memory inside the electronic controller and generally but not necessarily the image data is symmetrical, that is it is rendered on the assumption that the final image will be made up of pixels selected from for example a 300×300 dpi pixel matrix.

Thermal transfer coders operate either in continuous or intermittent printing mode. In continuous printing, the substrate is moved continuously whereas the printhead is fixed in position, the ribbon and substrate being moved past the stationary printhead. In intermittent printing, the substrate is stationary during printing and the printhead traverses across the substrate surface in the Y direction. Generally but not necessarily the ribbon is moved relative to the printhead at a speed equal to the speed of movement of the substrate relative to the printhead during printing.

When a resistor of the printhead is to be energised so as to heat the adjacent ribbon, a voltage is applied across that resistor in order to draw a current through the resistor. This current heats the resistor to a temperature at or above a threshold temperature sufficient to melt the ink on the ribbon. The response of the resistor is not however instantaneous. It takes a finite time for am individual resistor to heat up to the threshold temperature so as to melt and transfer the ink from the adjacent ribbon, and a finite time for a resistor to cool below the threshold temperature in the interval between successive control signals the first of which may demand the printing of a pixel and the second of which may not demand the printing of a pixel. Each row of data could require any given pixel to be either on or off, so each resistor must be capable of being either on or off at any time at which control signals are delivered to the printhead.

For as long as a resistor is heated to a temperature above the threshold temperature, ink on the adjacent ribbon will be melted. Thus by controlling the length of time for which a resistor is energised the length of the deposited pixel in the y direction can be adjusted. For example, in most operational circumstances, if a pixel of a given length is required in the image as printed, that given length can be produced at a first printhead/substrate speed by energising the respective resistor for a first time period, and can also be produced at a second printhead/substrate speed which is twice the first by energising the resistor for a second time period which is of half the duration of the first. Resistors must not be overheated however, and this therefore sets a limit for the maximum period for which a resistor may be energised. This limit can be significant at low printhead/substrate speeds, and can result in printing problems, for example the ribbon can become adhered to the substrate, or the image can have a "striped" appearance.

Modern printheads make use of sophisticated "dot history" techniques to squeeze greater performance out of a printhead and associated ribbon. In essence, dot history algorithms make use of knowledge relating to the pixels around a particular pixel the printing of which is to be controlled, as well as the state (on/off) of the resistor relating to that pixel and of the immediately adjacent resistors during the previous row of printed data. For example, if a resistor was on during one row printing cycle, and needs to be on during the subsequent row printing cycle, the printhead delivers to the resistor less power than if that resistor had been off during the previous row printing cycle as less power is required to reach the ink melt temperature. This avoids the resistor getting too hot, which would require a longer cooling period before the next row printing cycle could be initiated. Such dot history techniques have enabled the overall speed of the printing process to be increased but nevertheless for any given printhead there is still a maximum speed at which successive pixels can be printed by a single resistor. This imposes an upper limit on the maximum relative speed as between the printhead and the substrate during the printing process.

The maximum relative speed as between the printhead and the printed substrate which can be supported by any particular printhead is given by:

$$V_{max}=L/MT \text{ where}$$

L is a unit length;
M is the number of pixels per unit length L in the Y direction;
T is the minimum cycle period of an individual resistor.

Assuming that for any printhead T is fixed, the only way that the maximum speed $V_{max}$ can be increased is by reducing the number of pixels per unit length in the Y direction. Such an approach has been proposed, the proposal resulting in printing only of alternate pixels in the Y direction. Thus an image rendered in memory in the form of a 300 by 300 matrix would be printed in the form of a 150 by 300 matrix.

This makes it possible for the maximum printhead/substrate speed to be doubled, but at the cost of halving the printed image resolution in the Y direction.

It is also known to operate thermal transfer printers in the so-called "slip mode". A printer operating in slip mode drives the printing ribbon past the printhead at a speed which is lower than the relative speed as between the printhead and the substrate. For example the printer ribbon may be driven at half the substrate speed. This halves the usage of printer ribbon but the melted ink is "smeared" on the substrate so as to occupy twice the length of substrate than would be the case if the substrate was travelling at the same speed relative to the printhead as the ribbon. In order to maintain the correct image length on the substrate, every other row of pixels in the image memory is omitted. Given that every other row of pixels is emitted from the image, the substrate speed can be twice that possible if there was no slippage between the ribbon and substrate. However, although ribbon usage is halved, this is at the cost of halving image resolution in the y direction. Furthermore, if operating in any mode wherein the resolution of printing in the Y direction is reduced from "normal", then there is greater opportunity for the image quality to be compromised in terms of having a striped appearance, because the resistors cannot be heated for sufficiently long to print pixels without leaving gaps between consecutively printed pixels.

European patent specification No. 0945273 describes a known thermal transfer coder which relies upon omitting or repeat printing pixels of a rendered image. U.S. Pat. No. 5,816,719 describes how the aspect ratio of printed images can be restored when a print medium is travelling faster than the maximum normal speed for a printhead by "skipping" lines of dots in the image as rendered.

It is an object of the present to provide an improved printing method and apparatus which obviates or mitigates the problems outlined above by increasing the range of speeds at which a particular printing apparatus may be operated whilst maintaining acceptable printed image quality.

According to the present invention, there is provided a method for transfer an image of predetermined length onto a substrate by selective energisation of a row of printing elements in a printhead of a printing apparatus, the image being rendered in memory as a series of rows of pixels, the apparatus being set up to print out the rendered rows of pixels, and the apparatus being set up to control the spacing between printed rows of pixels in the direction of the length of the image resulting from relative displacement between the printhead and the substrate by controlling the delay between successive energisations of the printing elements, wherein operational characteristics of the printing apparatus are determined, and the image is rendered such that the number of rows of pixels in the rendered image is no greater than the maximum number of rows of pixels which can be printed in the length of the image given the operational characteristics of the printing apparatus.

Thus, in contrast to the prior an in which the image is rendered and then rows of pixels contributing to the rendered image are discarded if the operational mode of the printing apparatus makes it impossible to print all of the rows, in accordance with the present invention the image is rendered such that in all expected operational circumstances all of the rows of pixels contributing to the rendered image are printed.

Preferably, the minimum delay possible between successive energisations of the printing elements is calculated from the operational characteristics of the printing apparatus, and the resolution of the image is selected such that the delay between the energisations of the printing element to print out successive rows of the rendered image is always at least as great as the calculated minimum delay. For example, if values are determined for the maximum possible speed of relative displacement between the substrate and the printhead, and the minimum delay possible between successive energisations of the printing elements, the resolution of the image may be selected such that the delay between the printing of successive rows when the relative displacement speed is the maximum speed is no less than the minimum delay. Thus, despite limitations to the rate at which successive rows of pixels can be printed, the resolution is selected so as to ensure that even in the most challenging conditions, e.g. maximum speed, the printhead is capable of printing out all the rows of pixels in the rendered image.

The invention may be applied to printing apparatus in which a print ribbon is located between the printhead and the substrate such that ink is selectively transferred from the ribbon to the substrate as a result of energisation of the printing elements. The speed of displacement of the ribbon relative to the printhead may be less than the speed of displacement of the substrate relative to the printhead such that slip occurs between the ribbon and substrate, or the speed of displacement of the ribbon relative to the printhead may be substantially equal to the speed of displacement of the substrate relative to the printhead. The invention can provide enhanced performance in both types of apparatus.

Preferably, if the operational characteristics are determined as including a range of operational values, the resolution of the image is selected to ensure that all the rows of pixels in the rendered image can be printed for all of the possible range of operational values, and the selected resolution is maintained regardless of variations over time of the operational values. Alternatively, the selected resolution may be adjusted dynamically in response to the variations in the operational conditions provided all the rows of pixels in the rendered image can be printed.

If the operational characteristics are such that gaps will appear between the rows of pixels as printed which correspond to consecutive rows of pixels in the rendered image, additional rows of pixels may be printed between each adjacent pair of rows of pixels as printed which correspond to consecutive rows of pixels in the rendered image, the pixel content of the additional rows being calculated on the basis of the pixel content of the adjacent pair of rows. A count may be accumulated to determine whether or not a pixel shall be printed in a pixel area of an additional row, the count being accumulated on the basis of weighting values allocated to at least some of the immediately adjacent pixel areas in the two adjacent rows of pixels, the weighting values being accumulated if the associated pixel areas in the rendered image correspond to image area to be printed, and a pixel being printed in the pixel area of the additional row if the accumulated value exceeds a predetermined threshold.

If a first accumulated count does not exceed the predetermined threshold, a second count may be accumulated on the basis of different weighting values and a pixel printed in the pixel ea of the additional row if the accumulated second count value exceeds a predetermined threshold.

For example, weighting values of 1, 5 and 1 may be allocated to the three pixel areas of the preceding adjacent row of pixels which are immediately adjacent the pixel area of the additional row, weighting values of −1, 2 and −1 may be allocated to the three pixel areas of the following adjacent row of pixels which are immediately adjacent the pixel area of the additional row, and a pixel may be printed in the pixel area of the additional row of the accumulated value is equal to or greater than 3. Alternatively or in addition, weighting values of 1, 0, and 1 may be allocated to the three pixel areas of the preceding adjacent row of pixels which are immediately adjacent the pixel area of the additional row, weighting values of 0, 2 and 0 may be allocated to the three pixel areas of the following adjacent rows of pixels which are immediately adjacent the pixel area of the additional row, and a pixel may be printed in the pixel area of the additional row of the accumulated value is equal to or greater than 3.

The present invention also provides a method for generating a printed image by print or not printing a pixel of the image in each of a matrix of rows and columns of pixel areas, wherein alternate rows of the image are printed on the basis of stored pixel data read from an image memory, and the intervening rows of the image are printed on the basis of calculated pixel data, the calculated pixel data for any one pixel area being calculated as a function of the stored pixel data related to adjacent pixel areas in the two rows adjacent to the row of the said one pixel area.

The invention also provides an apparatus for transferring an image of predetermined length onto a substrate, comprising a printhead incorporating a row of printing elements which may be selectively energised, a memory in which an image may be stored, the image being rendered as a series of rows of pixels, and means for controlling the download of the rendered rows of pixels to the printhead, the control means comprising means for controlling the spacing between printed rows of pixels resulting from relative displacement between the print head and the substrate by controlling the delay between successive energisations of the printing elements, wherein means are provided for selecting the resolution of the rendered image such that the number of rows of pixels in the rendered image is no greater than the maximum number of rows of pixels which can be printed in the image given the operational characteristics of the apparatus.

The invention further provides an apparatus for generating a printed image, comprising a memory for storing pixel data corresponding to rows of pixels in an image to be printed, means for printing out the stored pixel data so as to produce spaced rows of pixels with each row of pixels in the printed image corresponding to a row of the stored pixel data, and means for printing out additional rows of pixel data between each pair of rows of pixel data which correspond to adjacent rows of pixel data in the stored image, the additional rows of pixel data being printed on the basis of the calculation of pixel data from the stored pixel data related to the two adjacent rows of pixels.

Embodiments of the invention will now be described, by way of example, with reference to the accompanying drawings, in which.

Figure 1:
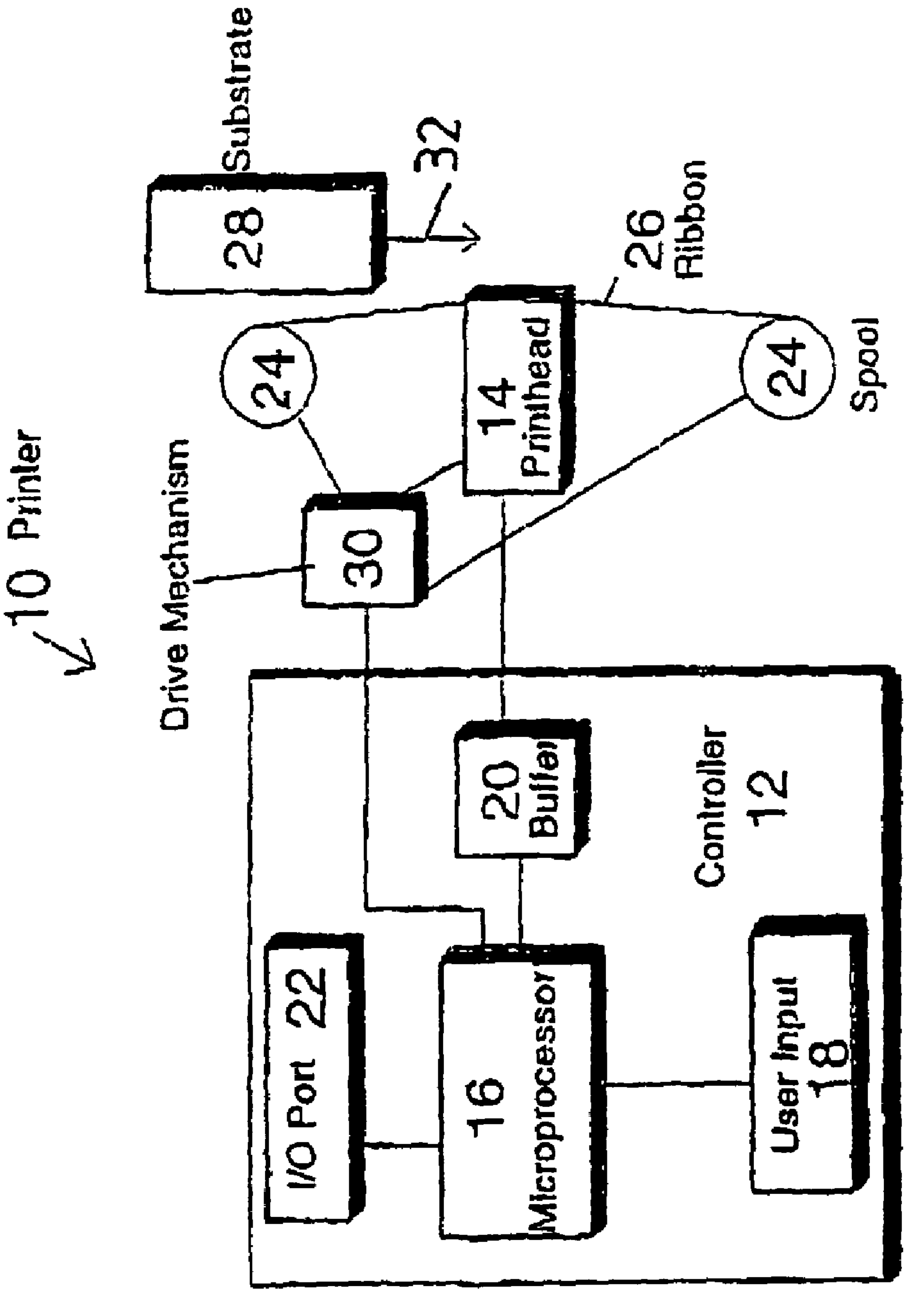
FIG. 1 is a schematic block diagram of a printer which may be operated in accordance with the present invention.

Referring to FIG. 1, a printer 10 is shown comprising a controller 12 and a printhead 14. Controller 12 comprises a microprocessor 16 or other suitably programmable device, and a user input 18 such as a touch screen display or keypad for example. Controller 12 further comprises a buffer memory 20 disposed between the micro processor 16 and the printhead 14. The controller 12 further comprises an input/output port 22 which can comprise one or more serial or parallel ports such as RS232, RS485, USB communication ports, network communication ports such as TCP/IP, or interface cards such as PCMCIA cards and so on.

Printer 10 flirter comprises a pair or spools 24 for carrying print medium, in this case a thermal transfer ribbon 26 which passes over a printing face of printhead 14. Printhead 14 comprises an array of individually operable printing elements to enable printing on a substrate 28 as it passes printhead 14. Energisation of one printing element will transfer one pixel of an image onto the substrate 28. Printer 10 further comprises a drive mechanism 30 for controlling movement of spools 24 and printhead 14 thereby to enable either continuous or intermittent printing on a substrate 28.

In continuous printing, the substrate 28 is moved continuously past stationary printhead 14 in the direction of arrow 32. The ribbon 26 is also moved past the printhead 14. The substrate 28 can for example comprise a web or continuously moving series of packages. Printing is effected on individual portions of substrate 28 as a result of the printhead 14 pressing the ribbon 26 against the substrate and selectively melting ink carried on the side of the ribbon facing the substrate.

During intermittent printing, the substrate 28 is advanced past the printhead 14 in a step-wise manner but is stationary relative to the printer 10 during each individual printing step during which the printhead 14 is moved relative to the substrate 28 and ribbon 26 to ensure printing at the correct location on substrate 28. After each individual printing step, the printed substrate and used ribbon 26 is moved away and replaced by a fresh section of the ribbon 26 and the next substrate 28 to be printed. Although not shown in FIG. 1, the ribbon 26 will extend around a peel-off roller which diverts the ribbon away from the substrate a short distance downstream of the printhead to ensure that the ribbon is not in contact with the substrate when the ink begins to solidify.

In both continuous and intermittent printing, generally the ribbon 26 is advanced in synchronism with the substrate 28 so that there is no relative movement between the substrate and the ribbon during each individual printing step. The driver mechanism 30 can however operate in reduced print medium usage (ribbon save) mode in which ribbon 26 is moved at a different speed to the substrate 28 in order to consume less ribbon. For example, ribbon usage can be halved if the ribbon 26 is advanced at half the speed of the substrate 28.

Printer 10 is configured to have a maximum resolution (defined as dots per inch or dpi) depending on the nature of the printhead 14. The quality of an image printed on a substrate 28 is determined by the density of pixels contributing to that image. The spacing between the printing elements of the array on printhead 14 defines the maximum resolution achievable by the printer 10. The array of printing elements supported by the printhead 14 extends in a row perpendicular to the direction of relative movement between the printhead and substrate. Assuming the length of the printing element array is the x direction (into the page of FIG. 1), and the direction of relative movement between the substrate and the printhead is the y direction (the direction of arrow 32), then the minimum spacing between adjacent printed pixels in the x direction is a function of the geometry of the printhead, whereas the minimum spacing between adjacent printed pixels in the y direction is a fiction of the speed of relative displacement between the substrate 28 and the printhead 14 and the timing delay between successive energisations of the printing elements. It is therefore necessary for the controller 12 to take account of the speed of relative displacement between the substrate 28 and the printhead 14 in determining the tuning of the application of control signals to the printhead to cause the individual printing elements to transfer ink from the ribbon 26 onto the substrate 28.

The controller 12 is pre-configured with data representing the maximum printing resolution capability of the printhead 14, or this information can be input for example through user input 18 to the microprocessor 16. Typically, the printhead 14 will support 300 printing elements per inch so that the maximum resolution in the x direction is 300 dpi. Preferably the maximum printing resolution of the printhead is used in the x direction and when possible the same resolution is used in the y direction. The resolution in the y direction may however be varied to increase the maximum permissible speed of relative displacement between the substrate 28 and the printhead 14 or to enable operation in ribbon save mode.

The user selects, enters or creates a print message or image via input 18 or input/output port 22 to micro processor 16. The print message can be created off-line by standard message creation software such as Zebras Bar One, or Claricoms, Clarisoft packages. These packages are capable of converting the message or image devised by the user as seen on screen into one of many message definition formats such as for example Zebras ZPL or Claricoms CIFF format. The message or image definition is then communicated to the controller 12 from one of these packages via input/output port 22.

The user is then able to select the position for the image on the substrate through use of input 18. Generally the user also has to select the resolution of the image in the y direction so as to ensure that the printhead can cope with the operational characteristics of the overall system and in particular the relative printhead/substrate speed. Alternatively, the controller may have the capability to select the y direction resolution automatically to match the instantaneous printhead/substrate speed. The resolution in the y direction might be the same as the resolution in the x direction, but in many circumstances has to be reduced, for example to half the resolution in the x direction, say 150 dpi rather than 300 dpi.

Thus, in a practical application of the present invention, the user may choose the resolution in the y direction that matches the operational characteristics of the printing machine which is to be used to generate the final image. The image resolution can be selected based on an examination of the relative text size contained in the image and scaling such that any reduction in resolution results in a minimum loss of information. The resolution is selected so that no rows of pixel information in the rendered image will be lost from the printed image. For example, if the printing machine is set up so that when running at maximum speed only 150 dpi can be printed in the y direction, the resolution selected is 150 dpi in the y direction. The controller then creates a bitmap image of the image which is rendered using a rendering algorithm on the basis of the proposed dpi ratio as between the x and y dimensions using for example a rendering algorithm such as Microsoft TrueType MTT for rendering algorithm which produces the best possible representation of a font in any given resolution. Accordingly, a rendered image is created and is then transferred to the buffer memory 20 (generally referred to as an image memory) or is rendered directly into the buffer memory 20, prior to transfer to the printhead 14 to energise the individual printing elements. The microprocessor 16 drives the drive mechanism 30 to appropriately set the relative speed of the ribbon with respect to the printhead and/or the substrate.

Figure 2:
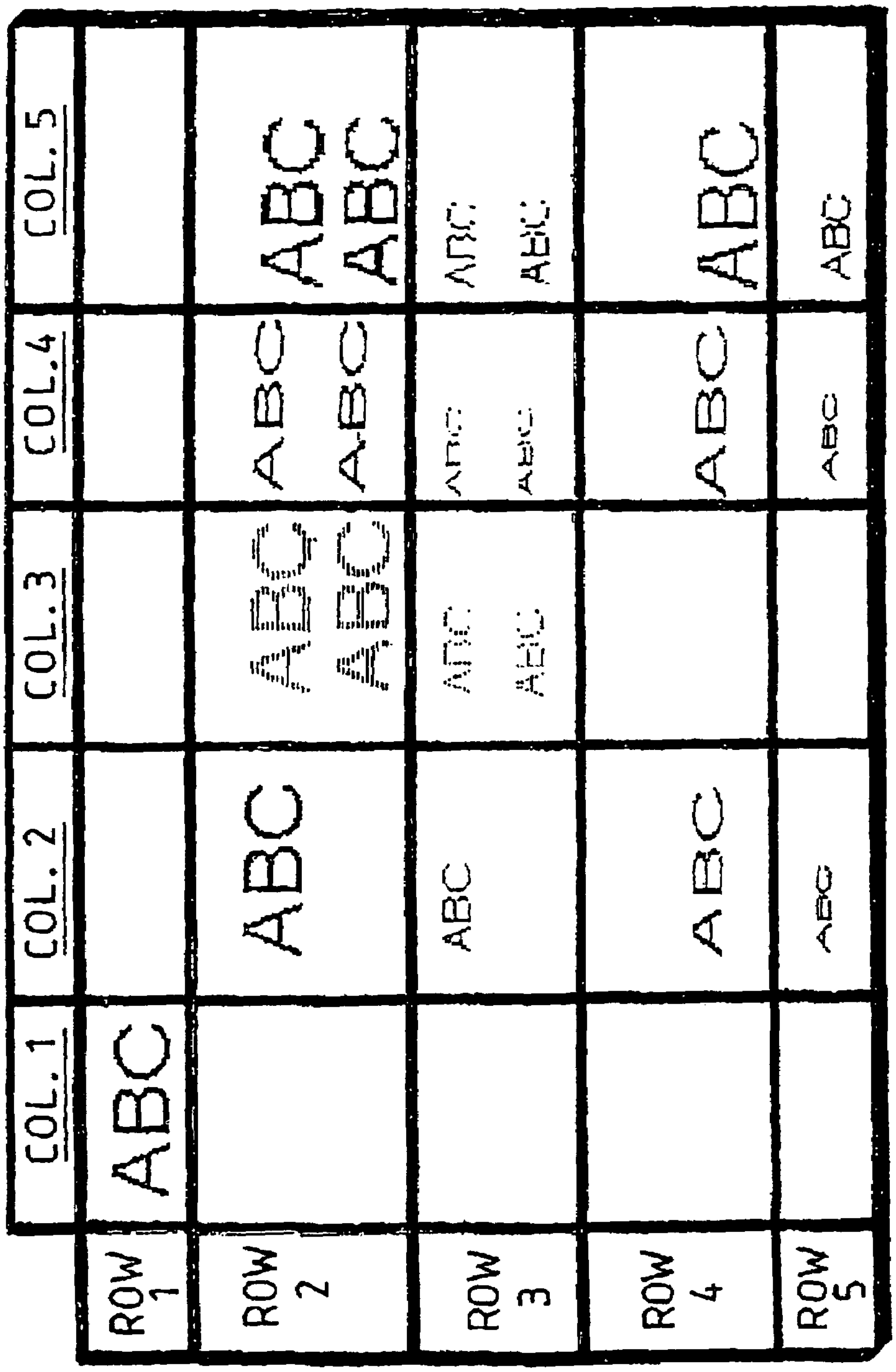
FIG. 2 is a schematic table contrasting the print quality of images which may be produced by applying the present invention with that produced by prior art systems.
Figure 3:
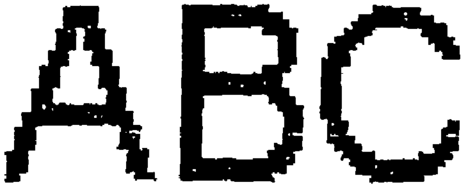
FIGS. 3 to 7 are enlarged representations of some of the images included in FIG. 2.

The improved quality of the printed image on a substrate achieved in accordance with the present invention is illustrated in FIG. 2. The image entered or devised by a user is shown in the upper left hand corner of the table (column 1, row 1) and the printed images on the substrate for four different printing scenarios are shown in the fifth column. A prior art technique for achieving a printed image for a “ribbon save mode” printing operation wherein a 2 to 1 ratio of slip printing is used is illustrated in rows 2 and 3. Here, the nominal image is first rendered into the image shown in column 2 (rows 2 and 3) after which the instructional data (which is actually sent to printhead 14) is reduced compared to the rendered image by omitting to send either odd or even rows of pixel data from the rendered image to the printhead to obtain the correct height and width (or aspect) ratio of the printed image in the slip printing operation. In the prior art examples, the waste image on the used ribbon is shown in column 4 (rows 2 and 3) in contrast to the printed image on the substrate shown in column 5 (rows 2 and 3) respectively for a 24 pixel size image at 300×300 dpi (image as printed approximately 2 mm high) and a 12 pixel size image at 300×300 dpi (image as printed approximately 1 mm high). Column 3 shows the “zebra-striped” representation of alternate lines of dots (pixels) used from the rendered image where the gaps represent the lines that are omitted so that 2 to 1 slip mode operation results in the desired printed image size. A similar effect would result if the printing apparatus was simply operating at such a high speed that it was only possible to print alternate rows of pixel data, the difference being that the waste image on the used ribbon would be the same size as the image in column 5 rows 2 and 3, rather than as shown in column 4 for 2:1 slip.

In contrast to the results achieved in the two prior art examples, if the nominal image is rendered in accordance with the present invention in the knowledge that either because of increased maximum printing apparatus speed or the adoption of 2 to 1 slip mode the maximum resolution in the y direction is 150 dpi, the image is rendered as shown in column 2, rows 4 and 5 at a resolution in the y direction of 150 dpi. The printed image on the substrate is shown in column 5. It will be seen that the improvement in the image as between rows 2 and 4 is not dramatic given the large size of the represented letters and the correspondingly large number of pixels used to make up the image. In contrast however there is a radical improvement in image quality for similar sized images as between the prior art represented in row 3 and the present invention represented in row 5.

Figure 4:
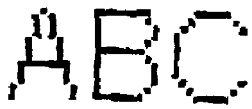
Figure 5:
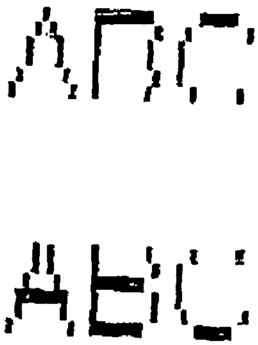

FIGS. 3 to 7 are enlarged views of the images represented in column 1 row 1, column 2 row 3, column 5 row 3, column 2 row 5 and column 5 row 5 respectively. It can be seen that the nominal image illustrated in FIG. 3 which is 24 pixels high (in the y direction) is rendered as illustrated in FIG. 4 with only 12 pixels in the y direction. Only half of these pixels contribute to the in image as printed, the image in the top half of FIG. 5 representing the selection of the six pixels in the odd rows of the image as rendered and shown in FIG. 4 and the image in the bottom half of FIG. 5 representing the selection of the six pixels in the even rows of the image as rendered and shown in FIG. 4. Not only does the images shown in FIG. 5 differ significantly from each other, but in addition neither is easy to recognise as "ABC".

Figure 6:
Figure 7:

Whereas the image as rendered shown in FIG. 4 is made up from 12 pixels only 6 of which contribute to one of the two possible printed images shown in FIG. 5, the image as rendered in accordance with the present invention and as shown in FIG. 6 as made up from only 6 pixels each of which will contribute to the image as printed shown in FIG. 7. There is therefore certainty as to the appearance of the image as printed, and that image is clearly recognisable as "ABC". Thus, a high quality printed image is achieved through the efficient and appropriate processing of the nominal image according to the invention whereby the image is transformed by being rendered at the resolution that matches the resolution capability of the apparatus in the effective operational mode of the apparatus. Accordingly rows of pixels are not missed out during the printing operation and as a result image quality is enhanced.

FIG. 2 represents the application of the invention to an apparatus operating in 2 to 1 slip mode. Regardless of the speed at which the apparatus is operated the invention will provide improved results. In the case of printing apparatus where there is no relative slippage between the printing ribbon and the substrate, the present invention can be used to increase the maximum speed of displacement as between the printhead and substrate by printing image data that has been rendered into smaller vertical resolutions. For example, the maximum speed can be doubled if the resolution is halved from say 300 dpi to 150 dpi. This approach results in a better image, with less chance of characters represented by the image losing key artefacts as compared with discarding half the rendered pixel data from the images printed.

However, assuming the same smaller vertical resolution is maintained regardless of instantaneous relative speed between the printhead and substrate, this technique for increasing the maximum speed leads to a resultant image that will appear to be "striped" if the relative substrate/printhead speed falls below a lower threshold speed below which the maximum length of a single pixel in the image as printed is insufficient to cause adjacent printed pixels to merge. This effect arises because, as the printhead/substrate speed slows down, the time delay between successive printhead energisation pulses increases. Because the row of heating elements on the printhead has an upper limit on the length of time that it may be switched on before permanent damage to the heating elements occurs, if the speed is sufficiently reduced the heating elements must be switched off for a period between successive cycles which is so long that ink cannot be transferred from the ribbon in a continuous strip. As a result, stripes become visible in the image as printed.

This problem of "slow speed" stripes could be avoided if the printer controller has sufficient processing power to reader a new image in the buffer memory between successive printhead energisations. In the event of the speed dropping below the lower threshold speed limit the image could be re-rendered at the nominal (higher) vertical resolution (say 300 dpi). All of the rows of pixels in this higher resolution rendered image would then be printed until the substrate/printhead speed rises above the lower threshold speed, at which point it would be possible to switch back to a lower resolution rendered image. Of course, it would be possible to switch between many different resolution levels dynamically in response to speed variations.

An alternative to re-rendering the image to dynamically track changes in substrate/printhead speed is to "fill in" the gaps between successive rows of pixels the presence of which gaps results in the striped appearance. This can be done by dynamically generating additional rows of pixels for insertion between adjacent rows of pixels which correspond to consecutive rows read out from the buffer memory. The pixel content of the additional rows can be generated by interpolation of the pixel content of the adjacent pair of rows which correspond to the consecutive rows read out from the buffer memory. Interpolation in this manner requires far less processing power than dynamic re-rendering of the image in response to variations in substrate/printhead speed.

A method for dynamically creating suitable "in-between" lines when required, for example when using high speed mode printing as described above, or slip mode at low speed when a striped effect results, is described with reference to FIGS. 8 and 9.

Figure 8:
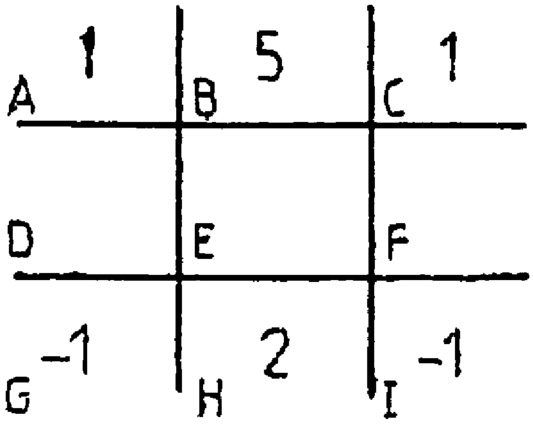
FIG. 8 is a schematic representation of a matrix used in an interpolation method in accordance with the present invention.
Figure 9:
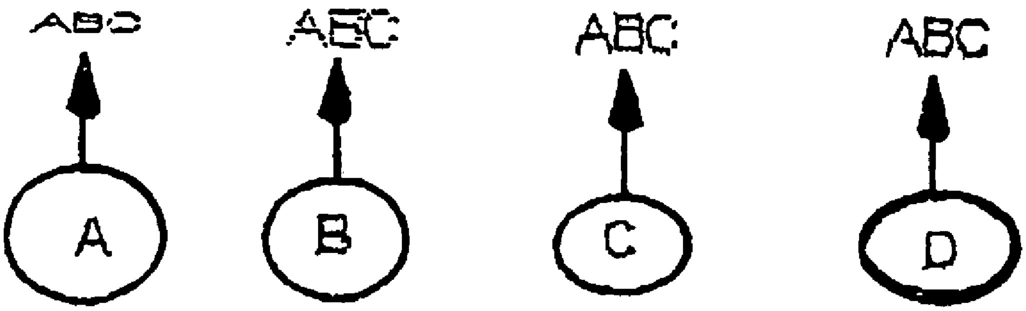
FIG. 9 schematically represents image enhancements achieved by applying the interpolation method in accordance with the present invention.

Referring to FIG. 8, a 3×3 matrix is shown with each of the nine areas in the matrix being labelled by a letter A to I. The matrix is used to determine whether or not a pixel is printed in pixel area E which is intended to contribute to an additional row of pixels to be located between two adjacent printed rows of pixels corresponding to consecutive rows of pixels in the rendered image, the first of the adjacent rows including pixels to be printed in areas A, B and C, and the second including pixels to be printed in areas G, H and I. A decision as to whether or not to print a pixel in the pixel area corresponding to the matrix area E is taken by reference to the presence or absence of printed pixels in the adjacent rows represented by areas A to C and G to I weighted by the values 1, 5, 1, −1, 2 and −1 shown in those areas.

In each of the pixel areas of the two rows adjacent the area corresponding to area E a pixel is either printed or not printed, that is a pixel is set to be either on or off. For an area which is on, the weighted value in the corresponding area of the matrix shown in FIG. 7 is accumulated. For an area which is off, the weighted value is not accumulated. Thus if in the two adjacent rows a pixel is to be printed in pixel areas A, B, G and H, but no pixel is to be printed in areas C and I, then the accumulated value is 1+5−1+2 to give a total of +7. If on the other hand pixels are to be printed in the pixel areas corresponding to areas C, G and I but no pixels are to be printed in the pixel areas corresponding to matrix areas A, B and H, the accumulated value is 1+1−1 to give an accumulated total of +1.

It will be appreciated that the total accumulated value for any pixel area E will be in the range −2 to +9. If the accumulated value is greater than or equal to 3, then a pixel is printed in the "in between" line at the pixel area corresponding to the matrix area E.

If the accumulated value is less than 3, no pixel is printed in that area. This calculation is done for all of the pixel areas in each additional or "in between" line.

Image quality can be enhanced further by processing additional matrices for the "in between" lines. This technique is illustrated by FIG. 9. A shows the rendered image buffer at a reduced resolution to enable high speed printing, B is the image as printed in high speed (low resolution) mode but with the adjacent pixels rows which correspond to the consecutive rows in the rendered image being spread out as a result of a low substrate/printhead speed so that the image as printed presents a striped appearance, C is the image produced using the matrix of FIG. 8 to insert additional rows of pixels between the rows shown in B, and D represents the image which results from using two matrixes, that is the matrix of FIG. 8 and an additional matrix in which areas A, B and C carry weighing values of 1, 0 and 1 respectively and areas G, H, I carry weighting values of 0, 2 and 0 respectively. If consideration of the matrix of FIG. 8 results in the printing of a pixel, the pixel is printed and no reference is made to the additional matrix. If however consideration of the matrix of FIG. 8 results in an accumulated value less than 3 so that no pixel is to be printed, then the additional matrix is considered, resulting in a further accumulated value. If that value is 3 or 4 the pixel is printed, whereas if the accumulated value is 0, 1 or 2 no pixel is printed. For example, unless a pixel has been printed in the pixel area H (see FIG. 8) and one or both of pixel areas A and C, no pixel will be printed.

The invention claimed is:

1. A method for transferring an image of predetermined length onto a substrate by selective energisation of a row of printing elements in a printhead of a printing apparatus, the image being rendered in memory as a series of rows of pixels, the apparatus being set up to print out the rendered rows of pixels, and the apparatus being set up to control spacing between printed rows of pixels in a direction of a length of the image resulting from relative displacement between the printhead and the substrate by controlling a delay between successive energisations of the printing elements, wherein operational characteristics of the printing apparatus are determined, and the image is rendered such that a number of rows of pixels in the rendered image is no greater than a maximum number of rows of pixels which can be printed in the length of the image given the operational characteristics of the printing apparatus, and wherein a minimum delay possible between successive energisations of the printing elements is calculated from the operational characteristics of the printing apparatus, and a resolution of the image is selected such that the delay between the energisations of the printing element to print out successive rows of the rendered image is always at least as great as the calculated minimum delay.

2. A method according to claim 1, wherein a maximum possible speed of relative displacement between the substrate and the printhead is determined, the minimum delay possible between successive energisations of the printing elements is determined, and the resolution of the image is selected such that the delay between the printing of successive rows when the relative displacement speed is the maximum speed is no less than the minimum delay.

3. A method according to claim 2, wherein a print ribbon is located between the printhead and the substrate such that ink is selectively transferred from the ribbon to the substrate as a result of energisation of the printing elements, a speed of displacement of the ribbon relative to the printhead being substantially equal to a speed of displacement of the substrate relative to the printhead.

4. A method for transferring an image of predetermined length onto a substrate by selective energisation of a row of printing elements in a printhead of a printing apparatus, the image being rendered in memory as a series of rows of pixels, the apparatus being set up to print out the rendered rows of pixels, and the apparatus being set up to control spacing between printed rows of pixels in a direction of a length of the image resulting from relative displacement between the printhead and the substrate by controlling a delay between successive energisations of the printing elements, wherein operational characteristics of the printing apparatus are determined, and the image is rendered such that a number of rows of pixels in the rendered image is no greater than a maximum number of rows of pixels which can be printed in the length of the image given the operational characteristics of the printing apparatus, and wherein a print ribbon is located between the printhead and the substrate such that ink is selectively transferred from the ribbon to the substrate as a result of energisation of the printing elements, a speed of displacement of the ribbon relative to the printhead being less than a speed of displacement of the substrate relative to the printhead such that slip occurs between the ribbon and substrate.

5. A method for transferring an image of predetermined length onto a substrate by selective energisation of a row of printing elements in a printhead of a printing apparatus, the image being rendered in memory as a series of rows of pixels, the apparatus being set up to print out the rendered rows of pixels, and the apparatus being set up to control spacing between printed rows of pixels in a direction of a length of the image resulting from relative displacement between the printhead and the substrate by controlling a delay between successive energisations of the printing elements, wherein operational characteristics of the printing apparatus are determined, and the image is rendered such that a number of rows of pixels in the rendered image is no greater than a maximum number of rows of pixels which can be printed in the length of the image given the operational characteristics of the printing apparatus, wherein the operational characteristics are determined as including a range of operational values, a resolution of the image is selected to ensure that all the rows of pixels in the rendered image can be printed for all of the possible range of operational values, and a selected resolution is maintained regardless of variations over time of the operational values.

6. A method according to claim 5, wherein if the operational characteristics are such that gaps will appear between the rows of pixels as printed which correspond to consecutive rows of pixels in the rendered image, additional rows of pixels are printed between each adjacent pair of rows of pixels as printed which correspond to consecutive rows of pixels in the rendered image, the pixel content of the additional rows being calculated on the basis of a pixel content of the adjacent pair of rows.

7. A method according to claim 6, wherein a count is accumulated to determine whether or not a pixel shall be printed in a pixel area of an additional row, the count being accumulated based upon weighting values allocated to at least some immediately adjacent pixel areas in two adjacent rows of pixels, the weighting values being accumulated if associated pixel areas in the rendered image correspond to image areas to be printed, and a pixel being printed in the pixel area of the additional row if the accumulated value exceeds a predetermined threshold.

8. A method according to claim 7, wherein if a first accumulated count does not exceed the predetermined threshold, a second count is accumulated based upon different weighting values and a pixel is printed in the pixel area of the additional row if the accumulated second count value exceeds a predetermined threshold.

9. A method according to claim 7, wherein weighting values of 1, 5 and 1 are allocated to three pixel areas of the preceding adjacent row of pixels which are immediately adjacent a pixel areas of the additional row, weighting values of −1, 2 and −1 are allocated to three pixel areas of the following adjacent row of pixels which are immediately adjacent the pixel area of the additional row, and a pixel is printed in a pixel area of the additional row if an accumulated value is equal to or greater than 3.

10. A method according to claim 7, wherein weighting values of 1, 0 and 1 are allocated to three pixel areas of the preceding adjacent row of pixels which are immediately adjacent a pixel areas of the additional row, weighting values of 0, 2 and 0 are allocated to three pixel areas of the following adjacent row of pixels which are immediately adjacent the pixel area of the additional row, and a pixel is printed in a pixel area of the additional row if an accumulated value is equal to or greater than 3.

11. A method for transferring an image of predetermined length onto a substrate by selective energisation of a row of printing elements in a printhead of a printing apparatus, the image being rendered in memory as a series of rows of pixels, the apparatus being set up to print out the rendered rows of pixels, and the apparatus being set up to control spacing between printed rows of pixels in a direction of a length of the image resulting from relative displacement between the printhead and the substrate by controlling a delay between successive energisations of the printing elements, wherein operational characteristics of the printing apparatus are determined, and the image is rendered such that a number of rows of pixels in the rendered image is no greater than a maximum number of rows of pixels which can be printed in the length of the image given the operational characteristics of the printing apparatus, wherein the operational characteristics are determined as possibly including a range of operational values, variations with time of the operational values are detected, and a selected resolution is adjusted in response to detection of variations in the operational values such that all the rows of pixels in the rendered image can be printed given the detected operational values.

* * * * *